United States Patent [19]

Hopkins

[11] Patent Number: 5,142,572
[45] Date of Patent: Aug. 25, 1992

[54] TELEPHONE TERMINAL DISCOUNT ACCESSORY DEVICE

[76] Inventor: Will Hopkins, 322 W. 59th Pl., Chicago, Ill. 60621

[21] Appl. No.: 736,021

[22] Filed: Jul. 25, 1991

[51] Int. Cl.⁵ .................... H04M 1/00; H04M 1/21
[52] U.S. Cl. ................................. 379/393; 379/442
[58] Field of Search ............... 379/165, 387, 393, 442

[56] References Cited

U.S. PATENT DOCUMENTS 4,001,520  1/1977  Waldman et al. .................. 379/442
4,529,843  2/1985  Boechkmann ...................... 379/393

Primary Examiner—Stafford D. Schreyer

[57] ABSTRACT

A telephone terminal disconnect accessory device for automatically disconnecting or hanging up the telephone at a first telephone terminal station when it is desirable to hold a conversation at a second telephone terminal station without having to return to the first telephone terminal station where the telephone was answered or from which a call was made, the device comprising a housing having at least two female modular jacks disposed in the walls thereof, and including an on/off switching means, a variable timing means, a latching relay means, a re-set switching means, and a transistor battery power supply.

8 Claims, 1 Drawing Sheet

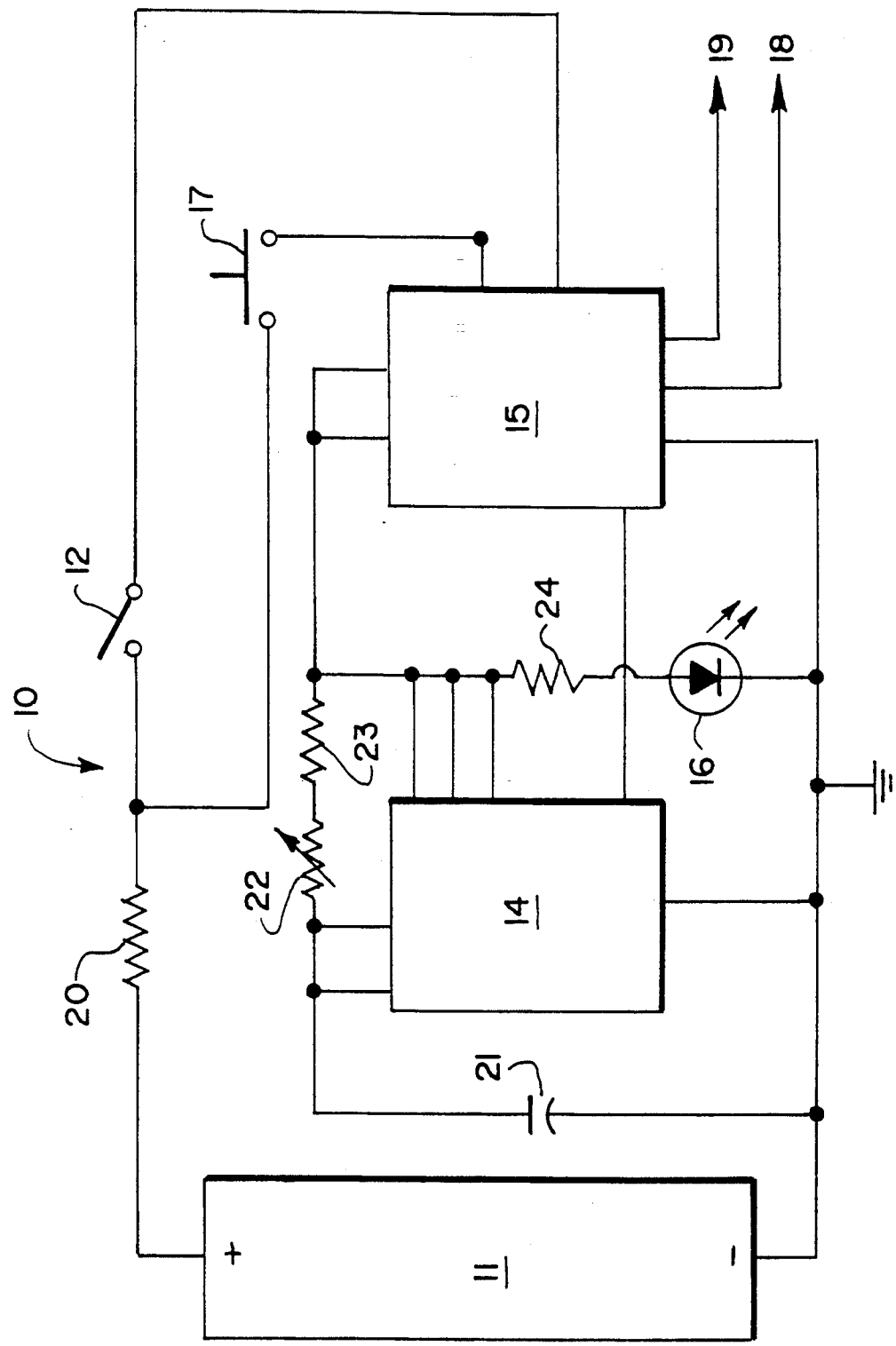

TELEPHONE TERMINAL DISCOUNT ACCESSORY DEVICE

BACKGROUND OF THE INVENTION

This invention relates to a device for hanging up or disconnecting a telephone terminal in a closed telephone system such as that normally being found in the home.

More particularly, the present invention relates to an accessory device adaptable to a home telephone terminal, such device being useful in automatically hanging up or disconnecting the telephone at a first telephone terminal station when it is desirable to converse at a second telephone terminal station without the necessity of returning to the first telephone terminal station to hang up the telephone.

DESCRIPTION OF THE PRIOR ART

The prior art has disclosed business telephone systems wherein calls may be received at a first telephone terminal station and subsequently transferred to a second telephone terminal station for conversation. In this situation, the operator at the first telephone terminal station puts the caller on "hold" until the call is answered at a second telephone terminal station. Such is the case with most office telephone systems. The prior art, however, has not disclosed a home telephone system or telephone system accessory device such as is disclosed in the present invention.

While the applicant has discovered no prior art reference which would preclude patent issuance on the present invention, power cut control interface devices have been disclosed for telephone systems. Art falling in this category, of which applicant is presently aware, is disclosed in U.S. Pat. Nos. 4,618,304; 4,723,919; 4,847,899; and 4,847,900.

SUMMARY OF THE INVENTION

It is therefore an object of the present invention to provide a telephone terminal accessory device useful in automatically hanging up the telephone at a first telephone terminal station when it is desirable to converse at a second telephone terminal station.

It is another object of the present invention to provide a telephone terminal disconnect accessory device which accomplishes this function without interfering with the normal operations of a home telephone system.

It is a further object of this invention to provide a telephone terminal disconnect accessory device which is easy to adapt to a home telephone terminal, and which easy to operate.

These and other objects of the present invention are accomplished through the provision of a telephone terminal disconnect accessory device useful in facilitating the automatic disconnection or hanging up of a telephone at a first telephone terminal station of a closed telephone system having a number of telephone terminals when it is desirable to hold a conversation at a second telephone terminal station in that system without having to return to said first telephone terminal station to hang up the telephone terminal, or without seeking the assistance of another person to accomplish same, said device comprising a housing having at least two female modular telephone jacks adapted thereto for attachment to the wall plate of an incoming telephone line and said first telephone terminal station, said housing including (a) an on/off switching means for activating or de-activating said disconnect device, (b) a variable timing means for setting a desired time delay period after which said disconnect device functions to disconnect or hang up the telephone at said first telephone terminal station while being transparent to system operations at said second or other telephone terminal stations, (c) a latching relay means operatively connected to said variable timing means for breaking the connection at said first telephone terminal station when said time delay period elapses, and (d) a reset switching means for re-activating said disconnect device following use.

These and other objects of the present invention will be best understood upon a reading of the following detailed description taken in connection with the accompanying drawing figures which form part of the specification, with the understanding, however, that the invention is not confined to a strict conformity with the drawing but may be changed or modified so long as such changes and or modifications constitute no material departure from the salient features of the invention as expressed in the appended claims.

BRIEF DESCRIPTION OF THE DRAWINGS

FIG. 1 is a block diagram of the circuitry of an embodiment of the present invention.

DETAILED DESCRIPTION OF THE INVENTION

Referring now to the drawing figures, and first to FIG. 1, there is shown a block diagram of the telephone terminal disconnect accessory device 10 of the present invention. Disconnect accessory device 10 includes a power supply 11, an on/off switching means 12, a timing means 14, a relay means 15, an operational display means 16, a re-set switching means 17, and adapter means 18,19 for appropriate connection to a telephone terminal and an incoming telephone line.

Power supply 11 may be any appropriate power source, but is preferably a 9-volt transistor battery While battery 11 is used for providing ample power to disconnect accessory device 10, the electrical parameters of the telephone system remain intact, and are not interfered with in any way, as the operation of the device 10 is transparent thereto.

Battery 11 is operatively connected to on/off switching means 12 through which power is transferred to the remainder of the device 10. On/off switching means 12 may be a toggle switch, a push button switch or the like, as any of these means may be adapted for utilization in the present invention. When device 10 is turned on, operational display means 16 will illuminate. As can be seen in FIG. 1, a resistor 24 is operatively connected to operational display means 16 for reducing the voltage thereto in as much as the preferred operational display means 16, an LED, can only accomodate about 0.7 volts safely without burning out.

While the preferred power supply adapted for use in the present invention is a 9-volt transistor battery, device 10 is designed to function with less than 9 volts of electrical power. More specifically, it is contemplated that all of the component parts of the device 10 become operative at voltage levels of between 0.7 and 6.5 volts of electrical power. Accordingly, resistor 20, adapted to the positive side of battery 11, is a surge resistor and functions to limit the flow of current from battery 11 to on/off switching means 12 so as not to electrically overload the component parts of device 10.

Re-set switching means 17 is operatively connected to the positive side of battery 11 between resistor 20 and on/off switching means 12. This near side arrangement facilitates the resetting of device 10 for further use whether on/off switching means 12 has been activated or not. The positioning of re-set switching means 17 on the far side of the on/off switching means 12 is not preferred as such an arrangement would permit re-setting of the device 10 only in the "on" mode.

Re-set switching means 17, preferably of the push button variety, is connected on its positive side to relay 15, and functions to de-activate the connection between the device 10 and the telephone terminal when activated by timing means 14 as described hereinbelow.

Relay 15 is preferably a low signal, latching type relay such as a DPDT #5-139 (Part No. G6AK-234P-ST-US-DC5) provided by Omron Electronics Inc. Relay 15 also functions to disconnect power flowing from battery 11 to the remainder of the components of device 10, thus, preserving the life span of the component parts of the device, as well as preserving the power stored in battery 11 for extended future operation of the device.

Relay 15 is connected on its positive side to on/off switching means 12, while being connected to battery 11 on its negative side. Relay 15 is also connected on its negative side to timing means 14, and to two female modular jacks 18,19 which are respectively adapted for connection to the wall plate of an incoming telephone line and to the telephone terminal to which disconnection device 10 is connected.

Timing means 14 preferably includes an eight pin integrated circuit variable timer operating in the monostable mode such as an LM555 (TM) provided by National Semiconductor Corporation. Due to its monostable mode of operation, the variable timer functions as a one-shot. The external capacitor 21 (FIG. 1) is initially held discharged by a transistor inside the variable timer. Upon application of a negative trigger pulse to the variable timer, its internal flip-flop is set, which releases a short circuit across external capacitor 21 and drives the output high. The voltage across capacitor 21, preferably a 220 microfarad capacitor, increases exponentially with the time. When the voltage across capacitor 21 reaches a certain level, the internal flip-flop of variable timer is re-set, which in turn, discharges external capacitor 21 rapidly and drives the output to its low state. The variable timer triggers on a negative going input signal when a certain level is reached. Once triggered, the variable timer will remain in this state until the set time has elapsed, even if it is triggered again during this interval.

Timing means 14 also includes a resistor 23 and a potentiometer 22. Resistor 23 is preferably a 51K resistor which functions to set the minimum time limit on the timer (12 seconds). Potentiometer 22, preferably a one meg linear potentiometer, functions in setting the maximum time limit on the timer (4 minutes).

After receiving or making a phone call, the operation of disconnect device 10 is initiated by first setting the desired time delay with variable timer 14 which provides the user with the option of selecting from a time span of from about 12 seconds to about 4 minutes. On/off switching means 12 is then set to the "on" position. This will cause operational display means 16, preferably a light emitting diode (LED), to illuminate, thereby indicating that power has been applied to the unit. At this time, the user may lay down the telephone at the first telephone terminal station, and pick up the telephone at a second telephone terminal station. When the time period selected by the user elapses, relay 15 will be triggered, and will, in turn, disconnect the negative side of the first telephone terminal to which disconnect device 10 is connected, as well as power supply 11. Thereupon, there is no need for the user to return to the first telephone terminal station to hang up the telephone as disconnect device 10 has accomplished the task. The first telephone terminal, to which disconnect device 10 is connected, and which has its receiver off the hook, will appear to have been severed from the telephone system, thus allowing the user to utilize the telephones located at other telephone terminal stations for making and receiving calls without interference of any kind from the disconnected first telephone terminal.

Therefore, what is claimed is:

1. A telephone terminal disconnect accessory device useful in facilitating the automatic disconnection or hanging up of a telephone at a first telephone terminal station of a closed telephone system having a number of telephone terminals when it is desirable to hold a conversation at a second telephone terminal station without having to return to said first telephone terminal station to hang up the telephone terminal, or without seeking the assistance of another person to accomplish same, said device comprising a housing having at least two female modular telephone jacks adapted thereto for attachment to the wall plate of an incoming telephone line and said first telephone terminal, said housing including
   (a) an on/off switching means for activating or deactivating said disconnect accessory device,
   (b) an operational display means for indicating whether said disconnect accessory device is in the activated or deactivated mode,
   (c) a timer means for setting a time delay period after which said disconnect accessory device functions to disconnect or hang up the telephone at said first telephone terminal station,
   (d) a relay means operatively connected to said timing means for breaking the connection at said first telephone terminal station when said time delay period elapses,
   (e) a re-set switching means for re-activating said disconnect accessory device following use, and
   (f) a power source for providing an ample supply of power to said disconnect accessory device.

2. The telephone terminal disconnect accessory device as described in claim 1, wherein said on/off switching means may be a toggle switch, push button or the like.

3. The telephone terminal disconnect accessory device as described in claim 1, wherein said operational display means is a light emitting diode (LED).

4. The telephone terminal disconnect accessory device as described in claim 1, wherein said timing means includes a variable timer, a 51K resistor for setting its minimum time limit, and a one meg potentiometer for setting its maximum time limit.

5. The telephone terminal disconnect accessory device as described in claim 1, wherein said variable timer is an eight pin integrated circuit timer operating in the monostable mode.

6. The telephone terminal disconnect accessory device as described in claim 1, wherein said relay means is a low signal, latching type relay.

7. The telephone terminal disconnect accessory device as described in claim 1, wherein said power source is preferably a 9-volt transistor battery.

8. The telephone terminal disconnect accessory device as described in claim 1, wherein said housing is fabricated of a durable plastic having the requisite structural integrity and material characteristics.

* * * * *

UNITED STATES PATENT AND TRADEMARK OFFICE
CERTIFICATE OF CORRECTION

PATENT NO. : 5,142,572

DATED : Aug. 25, 1992

INVENTOR(S) : Will Hopkins

It is certified that error appears in the above-identified patent and that said Letters Patent is hereby corrected as shown below:

On the title page, in item [54] and in column 1, lines 1-3, in the title, "TELEPHONE TERMINAL DISCOUNT ACCESSORY DEVICE" should be --TELEPHONE TERMINAL DISCONNECT ACCESSORY DEVICE--.

Signed and Sealed this

Third Day of November, 1992

Attest:

DOUGLAS B. COMER

*Attesting Officer*    Acting Commissioner of Patents and Trademarks